United States Patent [19]

Padwa et al.

[11] Patent Number: 5,180,777
[45] Date of Patent: Jan. 19, 1993

[54] RUBBER-MODIFIED NYLON COMPOSITION

[75] Inventors: Allen R. Padwa, Worcester; Richard E. Lavengood, Longmeadow, both of Mass.; Raman Patel, Akron, Ohio

[73] Assignee: Monsanto Company, St. Louis, Mo.

[21] Appl. No.: 733,017

[22] Filed: Jul. 19, 1991

Related U.S. Application Data

[63] Continuation of Ser. No. 237,632, Aug. 26, 1988, abandoned, which is a continuation of Ser. No. 14,885, Feb. 13, 1987, abandoned, which is a continuation-in-part of Ser. No. 881,014, Jul. 9, 1985, Pat. No. 4,777,211, which is a continuation-in-part of Ser. No. 767,944, Aug. 21, 1985, abandoned.

[51] Int. Cl.$^5$ .............................. C08L 77/00
[52] U.S. Cl. ........................... 525/66; 525/179
[58] Field of Search ......................... 525/66, 179

[56] References Cited

U.S. PATENT DOCUMENTS

| 3,668,274 | 6/1972 | Owens et al. | 260/857 |
| 4,174,358 | 11/1979 | Epstein | 525/183 |
| 4,306,040 | 12/1981 | Baer | 525/310 |
| 4,410,661 | 10/1983 | Epstein et al. | 525/184 |
| 4,496,690 | 1/1985 | Grant et al. | 525/66 |
| 4,554,320 | 11/1985 | Reimann et al. | 525/183 |
| 4,584,344 | 4/1986 | Baer | 525/66 |

FOREIGN PATENT DOCUMENTS

| 0068132 | 5/1981 | European Pat. Off. | 77/00 |
| 5448850 | 4/1979 | Japan | 67/2 |

Primary Examiner—Ana L. Carrillo
Attorney, Agent, or Firm—Thomas E. Kelley; Richard H. Shear; William J. Farrington

[57] ABSTRACT

A polyamide composition of improved impact resistance comprising a blend of components (A) a core-/shell graft rubber composition having a thermoplastic copolymer shell comprising a polyamide-interactive monomer, (B) a polyamide and, (C) an acid-containing acrylate copolymer rubber.

4 Claims, No Drawings

RUBBER-MODIFIED NYLON COMPOSITION

This application is a continuation of application Ser. No. 07/237,632, filed on Aug. 26, 1988, now abandoned, which is a continuation of Ser. No. 014,855 filed Feb. 13, 1987, now abandoned, which is a continuation-in-part of Ser. No. 881,014, filed Jul. 9, 1986, now U.S. Pat. No. 4,777,211, which is a continuation-in-part of Ser. No 767,944, filed Aug. 21, 1985, now abandoned, both of which are incorporated herein by reference.

This invention relates to thermoplastic polyamide polyblends and more particularly to impact resistant polyamide polyblends.

Unmodified thermoplastic polyamides are generally regarded as having good elongation and good energy to break as demonstrated in tensile tests and high tensile impact strength and high energy absorption as demonstrated in a falling dart test, e.g., the Gardner impact test. However, the polyamides are quite deficient in resistance to crack propagation. This deficiency is reflected in notch sensitivity, brittle breaks and occasional catastrophic failure of molded extruded parts. The tendency of polyamides to break in a brittle rather than a ductile fashion is a significant limitation of their end use applications.

A variety of additives have been added to polyamides with some improvement in toughness being obtained. Epstein (U.S. Pat No. 4,174,358) discloses a toughened multiphase thermoplastic composition consisting essentially of a polyamide matrix and at least one other phase containing straight-chain and branched-chain polymers having a particle size in the range of 0.01 to 1.0 micrometers, which adhere to the polyamide matrix resin and which also have tensile modulus in the range of about 1.0 to 20,000 psi (0.0069 to 137.8 MPa).

German Patent Publication DE3120-803 discloses thermoplastic polyamide molding compositions comprising a polyamide, a graft rubber composition, styrene-acrylonitrile copolymer and a styrene copolymer with 2 to 50 weight percent of carboxylic acid and/or anhydride groups. Such compositions provide some increase in Izod impact of a nylon composition, however, the improvements are less than can be achieved with the present invention.

Baer (U.S. Pat No. 4,306,040), incorporated herein by reference, teaches a multiphase core/shell polymer comprising a crosslinked elastomer core and a rigid thermoplastic polymer shell comprising a monoalkyl maleate or fumarate, styrene and acrylonitrile useful for blending with polyamides to provide toughened polyamide compositions. Baer's core/shell polymer requires that the rigid thermoplastic polymer shell around the elastomer core be functionalized with acid monomer and grafted to the core. Baer fails to recognize the improvement in impact resistance of nylon blend compositions when acid-containing acrylate copolymers are added to the blend.

Grant et al (U.S. Pat. No. 4,496,690), incorporated herein by reference, teaches polyblends prepared from polyamides and modified ABS graft copolymers where the graft shell contains a functionalized monomer such as acrylamide to provide toughened polyamide compositions. Such compositions have been characterized as having desirable toughness. However, it has been discovered that such toughness is not present in thicker molded sections, e.g. in reinforcing ribs, where toughness is often critical. It has been further discovered that enhanced toughness in thick sections can be obtained by addition of an acid-containing acrylate copolymer rubber by polyblends of polyamides and functionalized graft polymers such as acid or acrylamide functionalized ABS graft copolymer.

The present invention provides a polymeric composition or polyblend and molded or extruded parts prepared from the polyblend composition, wherein the polyblend comprises:

(A) a core/shell graft rubber composition comprising from 5 to 80 weight percent of a rubber core and from 20 to 95 weight percent of a thermoplastic copolymer shell comprising 0 to 75 weight percent vinylaromatic monomer, 0 to 75 weight percent polar monomer selected from the group consisting of (meth)acrylonitrile and $C_1$ to $C_4$ alkyl (meth)acrylate, and 1 to 25 weight precent of polyamide-interactive monomer having at least one functional group selected from the group consisting of acid, hydroxyl, amine, acrylamide, monoester maleate, acid anhydride and epoxy, (B) polyamide; and (C) acid-containing acrylate copolymer rubber having a glass transition temperature below 0° C.

The core/shell graft rubber composition can comprise from about 5 to 94.5 weight percent of the polymer blend and is typically an ABS or MBS type polymer, that is to say a rubber substrate grafted with a copolymer of a vinylaromatic monomer, a polar monomer and a polyamide interactive monomer. Preferred polar monomers are acrylonitrile and methyl methacrylate. The rubber substrate can be an unsaturated or saturated rubber. Unsaturated rubbers conventionally include diene rubbers such as polybutadiene, copolymers of butadiene with a comonomer such as styrene or acrylonitrile which rubber contains at least 50 percent and preferably 80 percent by weight of butadiene or a butadiene-based block or radial-block polymer. Useful saturated rubbers include acrylic rubbers such as butyl acrylate rubbers. Other rubbers with a glass transition temperature below 0° C. such as EPDM rubber, polypentenamer, polyisoprene, polychloroprene, other polyacrylate rubbers and the like can also be used. The glass transition temperature is conveniently measured by differential thermal analysis by heating a rubber sample under nitrogen at a rate of 10° C. per minute. Saturated rubbers preferably comprise a graft linking monomer such as allyl acrylate to provide unsaturation to facilitate grafting of the thermoplastic copolymer shell to the substrate rubber core.

Vinylaromatic monomers used for the thermoplastic copolymer shell include styrene, and substituted styrenes such as alpha-methyl styrene chlorostyrene, bromostyrene, p-methyl styrene, and vinyl toluene. In many cases the thermoplastic copolymer shell comprises a copolymer of styrene and acrylonitrile in a weight ratio of styrene to acrylonitrile in the range of 75:25 to 50:50. The monomers comprising the thermoplastic copolymer shell are preferably polymerized in the presence of an grafted to the substrate rubber core. Advantageously, graft polymerization conditions are selected to provide a graft copolymer fraction, i.e., graft efficiency of at least 20 weight percent and preferably at least 40 weight percent of the total copolymer present in the graft rubber composition, and provided the grafted copolymer fraction is maintained above 20 weight percent, the graft rubber composition may be diluted by addition of separately prepared copolymer of vinyl aromatic monomer, polar comonomer and polyamide-interactive monomer. Graft polymerization conditions are advantageously selected to provide a copolymer of weight average molecular weight less than 200,000 and preferably less than 150,000 measured on the ungrafted fraction by gel permeation chromatography as hereinafter described. The particle size of the rubber graft composition is advantageously in the range of 0.05 to 1.0 microns, preferably in the range of 0.1 to 0.5 microns, measured as a weight average particle size diameter by centrifugal photosedimentometer. Methods of preparing core/shell graft rubber compositions useful in the polyblend of this invention are disclosed in U.S. Pat. Nos. 3,668,274; 4,496,690; and 4,584,344, all of which are incorporated herein by reference.

The polyamide can comprise from about 5 to about 94.5 weight percent of the polymer blend of this invention and can be nylon 6 or poly(caprolactam), nylon 11 or poly(11-aminoundecanoic acid), nylon 12 or poly(-lauryl lactam) or poly(12-aminododecanoic acid), nylon 6,6 or poly(hexamethylene adipamide), nylon 6,9 or poly(hexamethylene azelamide) or poly(hexamethylene nonandiamide), nylon 6,10 or poly(hexamethylene sebacamide) or poly(hexamethylene decanediamide), nylon 6,12 or poly(hexamethylene dodecanoamide), nylon 4 or poly($\omega$-butyrolactam), nylon 7 or poly(7-aminoheptanoic acid) or poly(7-aminooenanthylic acid), nylon 8 or poly(8-aminocaprylic acid) or poly(8-aminooctanoic acid), nylon 10,6 or poly(decamethylene adipamide) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—(CH$_2$)$_4$—COOH] residues in nylon 6,6 by those from mixtures of about 30–60 percent terephthalic acid (TA, or p—HOOC—C$_6$H$_4$—COOH)/70–40 percent isophthalic acid (IA, or m—HOOC—C$_6$H$_4$—COOH) gives suitable PARNs which are high-melting, partly crystalline nylons 6,TA-co-6,IA or poly(hexamethylene tere-co-isophthalamides). Other suitable PARNs are partly crystalline nylons 6,6-co-6,-TA, nylons 6,6-co-6,IA, nylons 6,6-co-6,-TA-co-6,IA, and other similar PARNs, including partly crystalline PARNs wherein some of the diamine residues have aromatic character and those containing lactam residues, such as nylons 6-co-6,6-co-6,TA.

Also suitable are various types of copolyamides, block copolymers, and graft copolymers. The preferred polyamide is selected from the group consisting of nylon 6, nylon 6,6, nylon 6,9 and a random copolymer of nylon 6,6 and nylon 6.

The molecular weight of the polyamide is advantageously selected in the range of 5000 to 35,000 number average, preferably 8000 to 20,000 to provide polyamide compositions which can be readily molded by injection or extrusion techniques.

The acid-containing acrylate copolymer rubber can comprise from about 0.5 to about 20 weight percent of the polymer blend of this invention and has acid groups capable of reaction with the polyamide through its terminal amine groups, and has a glass transition temperature (Tg) below room temperature. Suitable acid-containing acrylic copolymer rubbers comprise rubbery ethylenically unsaturated carboxylic acid-acrylic ester copolymers. The rubbers of the invention contain about 0.5 to 25 mole percent of an interpolymerized acid-containing monomer such as acrylic or methacrylic acid or C$_1$ to C$_{12}$ monoalkyl esters of diacids such as monomethyl maleate and mono-dodecyl fumarate, a dicarboxylic acid such as fumaric acid, maleic acid, itaconic acid, aconitic acid or citraconic acid, an anhydride, such as maleic, itaconic, aconitic or citraconic anhydride. They are distinguished by their acid functionality from polyacrylate rubbers which generally are essentially non-functionalized acrylic ester polymers. Suitable rubbers include acrylic acid-acrylic ester-alpha-olefin terpolymers which are essentially non-crystalline and have glass transition temperatures (Tg) below room temperature. The rubber may be prepared by partial hydrolysis of an acrylate-olefin copolymer rubber to obtain the required acid groups. Suitable copolymer rubbers are preferably prepared by polymerization of a C$_1$ to C$_{10}$ alkyl acrylate, an alpha-olefin of 2–8 carbon atoms and an acid monomer selected from the group consisting of acrylic acid, methacrylic acid and C$_1$ to C$_4$ monalkyl ester of maleic and fumaric acids. Preferred rubbers are polymers of ethylene, C$_1$–C$_4$ alkyl acrylate and monoethyl maleate or acrylic acid. More preferred acid functional rubbers are polymers comprising at least 50 mole percent of ethylene, about 10 to 49.5 mole percent C$_1$ to C$_4$ alkyl acrylate, and about 0.5 to 10 mole percent monoethyl maleate or acrylic acid and contribute to significantly enhanced impact properties in the polyblends.

The acid-containing acrylate copolymer rubber is effective to improve impact resistance in the blend in the range of about 0.05 to about 20 weight percent. The preferred amount of acrylate copolymer rubber in the blend is from 1 to 15 weight percent, most preferably less than 10 weight percent, to provide enhanced impact properties.

In some cases it may be useful for the polymer blend to also comprise a second core/shell graft rubber composition in which the grafted copolymer of the shell is devoid of polyamide-interactive monomer, e.g. copolymers of styrene and acrylonitrile. When such graft rubber compositions are used in substantial quantity, e.g. at greater than about 5 to 10 weight percent of the polymer blend, it is often useful to provide a compatibilizer polymer to improve the impact resistance of the polymer blend. Such compatibilizer copolymer comprises a polyamide-interactive monomer, as defined above, e.g. an acid functional monomer. In many cases the compatibilizer copolymer is an acid-containing polymer. Such compatibilizer copolymer is typically a copolymer of a vinylaromatic monomer and a polar monomer selected from the group consisting of (meth)acryonitrile and alkyl (meth) acrylate together with about 0.5 to 50 mole percent of an acid functional monomer. When the compatibilizer copolymer is an acid-containing polymer, the acid functional monomer can comprise (meth-)acrylic acid, C$_1$–C$_{12}$ monoalkyl esters of diacids such as monoethyl maleate or fumarate, a dicarboxylic acid such as fumaric acid, maleic acid and the like, or an anhydride such a maleic anhydride. The compatibilizer copolymer is advantageously miscible, e.g. at least partially miscible, with the graft copolymer of the shell of the graft rubber composition which is devoid of polyamide-interactive monomer. Such miscibility is advantageously provided when the weight percent of acid monomer and polar monomer of the acid-containing copolymer is at least 15 weight percent of the polar monomer of the shell of the second core/shell graft rubber composition.

In addition to the above components the polyblends of the invention can advantageously contain other additives such as plasticizers, antioxidants, stabilizers, flame-retardants, fibers, mineral fibers, fillers, dyes, pigments and the like.

The components of the polyblend can be blended together by any convenient process. Usually however they are extrusion blended.

The invention is now described with reference to the following examples which are for the purposes of illustration only and are not intended to imply any limitation on the scope of the invention. The components described below are blended in a number of different ratios and tested for various properties. Parts and percentages are by weight unless indicated otherwise.

Nylon/ABS-1: a pelletized mixture of about 45 weight percent nylon 6 with acrylamide-functionalized core/shell graft rubber composition having a butadiene core and a copolymer shell of styrene, acrylonitrile and acrylamide, sold by Borg-Warner Chemicals, Inc. under the "Elemid" trademark.

Nylon/ABS-2: a pelletized mixture of about 56 weight percent nylon 6 with acrylamide-functionalized core/shell graft rubber composition having a butadiene core and a copolymer shell of styrene, acrylonitrile and acrylamide, sold by Borg-Warner Chemicals, Inc. under the "Elemid" trademark.

Acidified-Rubber-1: a shredded terpolymer of about 73 mole percent of ethylene, about 26 mole percent methyl acrylate and about 1 mole percent of monoethyl maleate sold as Vamac TM G rubber (a trademark of DuPont).

Acidified-Rubber-2: a pelletized terpolymer of ethylene, about 20 mole percent $C_2$-$C_4$ alkyl acrylate and and a low amount of maleic anhydride sold by CdF Chimie as Lotader ® HX8140. The terpolymer has a reported acid index by titration of 17 g [sic] KOH/g.

In each example and control example, one percent Ethanox TM 330 antioxidant, an alkylated phenol available from Ethyl Corporation, is added based on the total weight of the sample. All test specimens are "dry as molded", i.e. the polymers are dried to less than 0.25 weight percent water in the nylon phase and molded and tested.

Physically-blended mixtures of Nylon/ABS and Acidified-Rubber is fed into a Killion extruder possessing a single stage mixing screw (3.8 cm in diameter by 68.6 cm long) which is rotated at about 100 RPM. The rear zone of the extruder is heated to 254° C. with the middle and front zones heated to 260° C. The extruder is connected to a die with a single 0.318 cm diameter orifice through a 0.04 cm to 0.06 cm opening screen pack. The die is heated to 254° C. The extruded material is passed through a water bath and pelletized by a Kissam TM pelletizer. The rate of extrusion is 7.26 kgs per hour.

The pelletized blended material is then injection molded into specimen bars using a 28.3 g Arburg 200 "S" Allrounder TM molding machine available from Arburg Machinenfabrik in Wurttemburg, Germany, possessing a general purpose screw with a check ring and a straight-through nozzle.

The molding conditions are as follows:

| 1. Temperatures: | Rear Zone | 260° C. |
| --- | --- | --- |
|  | Center Zone | 260° C. |
|  | Front Zone | 260° C. |
|  | Nozzle | 260° C. |
|  | Mold | 43° C. |
| 2. Screw Speed: | 94 rpm | |

-continued

| 3. Injection Rate: | 1.3 seconds | |
| --- | --- | --- |
| 4. Hold and Cooling Times: | 25–35 seconds | |
| 5. Hydraulic Pressures: | Injection | 5512 kPa |
|  | Hold | 4823 kPa |
|  | Back | 344 kPa |

EXAMPLE 1

This example illustrates the improvement in impact resistance provided by acidified rubber to thick sections of nylon/ABS alloys. Polymer blends, prepared with varying amounts of Acidified-Rubber, e.g. 0–12%, as reported in Tables 1 and 2, were evaluated for Izod impact strength at the indicated temperature in accordance with ASTM D-256-56. The specimen bars were 0.64 cm (¼ inch) wide.

TABLE 1

| IMPACT RESISTANCE OF POLYMER BLENDS OF NYLON/ABS-1 | | | | | |
| --- | --- | --- | --- | --- | --- |
| Weight Percent Acidified Rubber-1 | 0 | 2 | 5 | 8 | 10 |
| Izod at 23° C. - (J/m) | 193 | 768 | 793 | 871 | 717 |

TABLE 2

| IMPACT RESISTANCE OF POLYMER BLENDS OF NYLON/ABS-2 | | | | | | |
| --- | --- | --- | --- | --- | --- | --- |
| Weight Percent Acidified Rubber-2 | 0 | 1 | 3 | 5 | 8 | 12 |
| Izod at 23° C. - (J/m) | 272 | 435 | 744 | 750 | 752 | 666 |
| Izod at 10° C. - (J/m) | 60 | — | — | — | 741 | — |

The test results reported in Tables 1 and 2 illustrate the dramatic and surprising increase in Izod impact strength afforded by addition of acid-containing acrylate copolymer rubber to polymer blends of polyamide and graft rubber composition having a thermoplastic copolymer shell comprising a nylon-interactive monomer.

EXAMPLE 2

This example illustrates the surprising improvement in low temperature impact resistance provided by Acidified-Rubber to thin sections of nylon/ABS alloys.

Polymer blends, prepared from nylon/ABS-1 and Acidified-Rubber-1 in the proportions reported in Table 3, were evaluated for Izod impact strength. The specimen bars were 0.32 cm (⅛ inch) wide.

TABLE 3

| IMPACT RESISTANCE OF POLYMER BLENDS OF NYLON/ABS-1 AND ACIDIFIED-RUBBER-1 | | | | |
| --- | --- | --- | --- | --- |
| Weight Percent Acidified Rubber-1 | 0 | 2 | 5 | 8 |
| Izod at 23° C. - (J/m) | 746 | 846 | 884 | 923 |
| Izod at 10° C. - (J/m) | 169 | 574 | 789 | 796 |

The test results reported in Table 3 illustrate the surprising increase in low temperature Izod impact strength by the addition of acid-containing acrylate copolymer rubber to polymer blends of polyamide and graft rubber composition having a thermoplastic copolymer shell comprising a nylon-interactive monomer. More specifically, the addition of such acrylate rubber copolymer affords to thin sections of nylon/ABS alloys impact resistance at low temperature comparable to the high level generally associated with such nylon/ABS alloys at room temperature.

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

We claim:

1. A polymer blend consisting essentially of:
   (A) 5 to 94.5 weight percent of a core/shell graft rubber copolymer comprising from 5 to 80 weight percent of a rubber core of polybutadiene or a butadiene copolymer and from 20 to 95 weight percent of a thermoplastic copolymer shell comprising from 0 to 75 weight percent styrene, 0 to 75 weight percent polar monomer selected from the group consisting of (meth)acrylonitrile and methyl (meth)acrylate, and 1 to 25 weight percent of acrylamide,
   (B) 5 to 94.5 weight percent of a polyamide; and 0.5 to 10 weight percent of a terpolymer rubber of an α-olefin, a $C_1$ to $C_4$ alkyl acrylate and an acid-containing monomer, having a glass transition temperature below 0° C.

2. The polymer blend of claim 1 wherein the polyamide comprises about 45 to 56 weight percent of said polymer blend and is nylon 6.

3. The polymer blend of claim 2 wherein said terpolymer rubber is a terpolymer of ethylene, a $C_1$ to $C_4$ alkyl acrylate, and an acid-containing comonomer selected from the group consisting of acrylic acid, methacrylic acid, maleic acid, fumaric acid, itaconic acid, aconitic acid, citraconic acid, maleic anhydride, itaconic anhydride, aconitic anhydride citraconic anhydride and $C_1$ to $C_{12}$ monoalkyl esters of maleic acid and fumaric acid.

4. The polymer blend of claim 3 wherein said terpolymer comprises at least 50 mole percent ethylene, about 0.5 to about 10 mole percent acrylic acid or monoethyl maleate and about 10 to 49.5 mole percent methyl acrylate.

* * * * *